No. 657,130. Patented Sept. 4, 1900.
W. A. OLMSTED.
VEHICLE AXLE LUBRICATOR.
(Application filed Sept. 29, 1899.)

(No Model.)

Witnesses
John B. Rutherford
Howard Thomas

Inventor.
William A. Olmsted
by H. Boyce Schermerhorn—
Attorney.

UNITED STATES PATENT OFFICE.

WILLIAM A. OLMSTED, OF BALA, PENNSYLVANIA.

VEHICLE-AXLE LUBRICATOR.

SPECIFICATION forming part of Letters Patent No. 657,130, dated September 4, 1900.

Application filed September 29, 1899. Serial No. 732,067. (No model.)

*To all whom it may concern:*

Be it known that I, WILLIAM A. OLMSTED, a citizen of the United States, residing at Bala, in the county of Montgomery and State of Pennsylvania, have invented a new and useful Improvement in Vehicle-Axle Lubricators, of which the following is a specification.

My invention relates to that class of vehicle-axle lubricators wherein the feed of the lubricant from the reservoir to the axle is regulated by a packing or layer of porous material, such as felt, through which the lubricant passes to the axle; and the object of my improvement is to provide a means whereby this packing may be readily adjusted, retained firmly in place when in use, and easily removed when clogged or when the insertion of a new packing becomes necessary. I attain this object by the mechanism illustrated in the accompanying drawings, in which—

Figure 3:
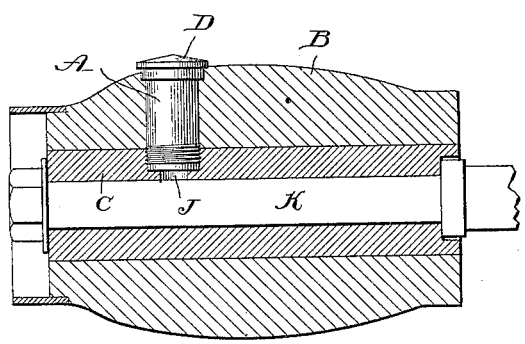
Figure 1:
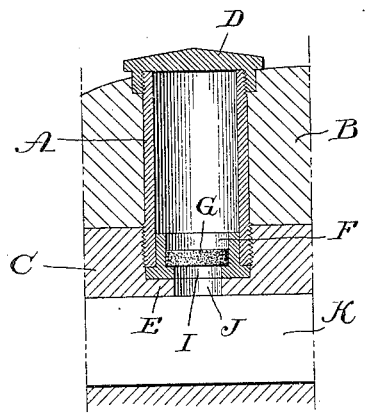
Figure 2:
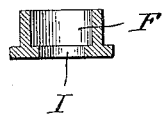

Figure 1 is an enlarged vertical section of the entire device. Fig. 2 is a vertical section of the independent collar which carries the packing-disk. Fig. 3 is a vertical section of the hub, showing the lubricator in place.

In Fig. 1, A is a cylindrical casing set vertically in the hub B and adjustably secured in the box C in the manner shown. The top of the casing is closed by the removable cap D. The box C is bored out in such manner as to leave the flange E next to the axle K.

F is a bushing carrying the packing-disk G, which latter is of felt or any suitably porous material. The bushing F is provided at its base with an inner and an outer flange, as shown in Fig. 2, and contains the opening I through its base. This opening coincides when the bushing is in position, as shown in Fig. 1, with the opening J in the box C.

The mode of insertion and removal of the lubricating device and of its operation is as follows: The entire device being removed from the hub and box, the packing-disk G is inserted in the bushing F, being of such dimension as to fit tightly therein. The bushing F slipping easily out of the end of the casing A and being of slight depth renders the packing-disk G readily adjustable in place. The bushing F is next inserted through the opening in the hub B and box C to the position shown in Fig. 1, where it rests upon the flange E of the box C. The diameter of the bushing F should be such as to admit of its being dropped into position. The casing A is then inserted in the hub B and secured in the box C in such manner that the lower rim of the casing rests upon the outer flange of the bushing F and presses the latter firmly down upon the flange E of the box C. The casing is then filled with oil or any suitable lubricant and the cap D secured in place, as shown in Fig. 1. The lubricant filters through the packing-disk G and passes by the openings I and J to the axle K.

To remove the packing-disk should it become clogged or the substitution of another be desired, the hub B is rotated until the cap D comes undermost. The cap is then removed, any remaining lubricant is allowed to run off, and the casing is detached from the box C and withdrawn, whereupon the bushing F, carrying the packing-disk, slides out. If preferred, the respective diameters of the bushing and casing may be made such as to admit of the bushing being pushed firmly into position in the end of the casing, the reservoir filled, the cap D secured, and the whole inserted together into the hub and box. In such case the casing, cap, and bushing can all be withdrawn together and the collar drawn off, if found necessary, to remove the packing. The casing A is designed to fit easily in the opening through the hub B to facilitate its ready insertion or removal.

A defect hitherto existing in lubricators of this class has been that the packing-disk, being necessarily of a somewhat soft and yielding material, tended to sag into the opening which communicates with the axle, thus choking the opening or becoming otherwise displaced. The inner flange of the bushing F overcomes this defect by retaining the disk G firmly in place. A further preëxisting defect in these lubricators has been that the packing was either located at the bottom of a non-removable reservoir, from which when clogged it was with difficulty extracted, or the packing was placed in the bottom of a removable reservoir in such a manner that it was difficult to insert and retain the packing in place. My device of a flanged bushing carrying the packing-disk and independent of the reservoir-casing obviates both of the foregoing preëxisting defects.

What I claim as my invention, and desire to secure by Letters Patent, is—

1. In an axle-lubricating device, the combination of the independent bushing F provided with external and internal flanges and placed loosely in the axle-box, the packing G located in said bushing and supported by the inner flange thereof, and the capped casing A secured in said box and retaining said bushing in position by means of contact between the external flange of said bushing and the lower rim of said casing substantially as described.

2. In an axle-lubricating device, the combination of the bushing F provided with an external flange and adapted to be loosely placed in the axle-box, the capped casing A adapted to be secured in said box to bear upon the external flange of said bushing, thereby retaining said bushing in position, and the packing G located in said bushing, substantially as described.

WILLIAM A. OLMSTED.

Witnesses:
E. L. RHOADS,
J. HOWARD RHOADS.